US005771285A

United States Patent [19]

Wittman

[11] Patent Number: 5,771,285
[45] Date of Patent: Jun. 23, 1998

[54] CIRCUIT AND METHOD FOR DETECTING TELEPHONE LINE STATUS AND TELEPHONE INSTRUMENT EMBODYING THE SAME

[75] Inventor: Brian Albert Wittman, Indianapolis, Ind.

[73] Assignee: Lucent Technologies, Murray Hill, N.J.

[21] Appl. No.: 597,758

[22] Filed: Feb. 7, 1996

[51] Int. Cl.⁶ .................................................. H04M 1/00
[52] U.S. Cl. ........................................ 379/377; 164/382
[58] Field of Search ............................ 379/377, 373, 379/382, 164, 165, 166, 156, 361, 362, 395

[56] References Cited

U.S. PATENT DOCUMENTS

| 4,028,493 | 6/1977 | Brennemann et al. | 379/100.06 |
|---|---|---|---|
| 4,839,920 | 6/1989 | Held-Ebert et al. | 379/377 |
| 4,862,491 | 8/1989 | LaSalle et al. | 379/102 |
| 4,868,873 | 9/1989 | Kamil | 379/377 |
| 4,998,276 | 3/1991 | Hasegawa | 379/361 |
| 5,241,591 | 8/1993 | Saji | 379/361 |
| 5,388,153 | 2/1995 | Burger et al. | 379/164 |
| 5,402,009 | 3/1995 | Kiyota | 327/176 |

Primary Examiner—Krista Zele
Assistant Examiner—Jacques M. Saint-Surin

[57] ABSTRACT

For use with a telecommunications network, circuit for, and method of, detecting telephone line status and a telephone instrument embodying the same. The circuit includes: (1) a high-impedance amplifier, couplable to the telecommunications network, for providing DC voltage representing a differential line voltage between tip and ring conductors of the telecommunications network and (2) a pulse-generation circuit, coupled to an output of the amplifier, for generating a signal having first and second states, the signal assuming the second state for a period of time inversely proportional to the differential line voltage between the tip and ring conductors.

20 Claims, 5 Drawing Sheets

CIRCUIT AND METHOD FOR DETECTING TELEPHONE LINE STATUS AND TELEPHONE INSTRUMENT EMBODYING THE SAME

TECHNICAL FIELD OF THE INVENTION

The present invention is directed, in general to telecommunications equipment and, more specifically, to a circuit and method for determining the status of a telephone line.

BACKGROUND OF THE INVENTION

Standard telephone devices are powered by DC power that is furnished by the telephone company over the same telephone lines that interconnect the telephone system equipment and users'devices. When the telephone is in an on-hook (idle) state, there is practically no DC current flow through the interconnecting telephone lines, and the line voltage is typically between 48 to 52 volts. When the telephone is in an off-hook state, a limited amount of DC current flow is used to power the telephone. The flow of this current through the impedance of the telephone line servicing the telephone device induces a voltage drop in the line voltage present at the terminals of the telephone device. The off-hook line voltage is generally less than or equal to 18 volts, with typical values less than or equal to 14 volts. Thus, whereas the line voltages corresponding to on-hook and off-hook conditions are quite different, a circuit which compares the line voltage with some threshold voltage would appear to be a natural candidate for a line-status monitor.

U.S. Pat. No. 4,451,707, entitled "Ring detector and Telephone Line Monitoring System for Telephone Answering Instrument," and issued on May 5, 1984 to Hanscom is directed to a line status circuit that compares a fixed reference voltage with the line voltage to determine whether a telephone device is in an on-hook or off-hook state. However, the amount of DC current flow over a telephone line is highly variable, depending considerably on the length of the telephone line servicing a particular telephone device. The variations in DC current flow, and thus the uncertainty of the expected drop in line voltage at the terminals of a telephone device, is a major disadvantage to a line status circuit which relies on a comparison of line voltage with a fixed reference voltage. Further complicating the determination of an appropriate on-hook/off-hook reference voltage is the existence of low-voltage Subscriber Loop Carrier ("SLC") lines which can have an on-hook voltage of 12 volts. This on-hook voltage is less than the off-hook voltage of some telephones, particularly phones on very short telephone lines.

An alternative to a comparison of the line voltage with a fixed reference voltage is disclosed in U.S. Pat. No. 5,388,153, entitled "Apparatus and Method for Detecting Telephone Line Status," issued on Feb. 7, 1995 to Burger, et al., and incorporated herein by reference. Burger, et al., is directed to an apparatus and method for detecting telephone line status by comparison of the line voltage with a variable reference voltage. In an illustrative embodiment of the invention disclosed by Burger, three values of differential line voltage are stored for each state (on-hook, off-hook), with one value for each state being measured and stored for three consecutive changes in the state of the line. The maximum of the three differential voltage values associated with the on-hook state is arithmetically averaged with the maximum of the three differential voltage values associated with the off-hook state to create the reference voltage. Thus, the reference voltage is adaptive to telephone lines where the on-hook and off-hook line voltages are not known a priori. For example, for all types of fines, the off-hook voltage is always less than the on-hook voltage. However, the on-hook voltage for a SLC line may be less than the off-hook voltage on a normal line.

Burger, et al., employs analog-to-digital conversion circuitry that may limit the precision of line voltage measurements. More precision may be desired if the telephone device shares a single telephone line with other parallel-connected telephone devices. In such cases, if more than one device is off-hook simultaneously, the differential line voltage is decreased. At decreased differential line voltages, the resolution of the analog-to-digital conversion circuit must be great enough to accurately determine the present line status.

The need for improved resolution in the measurement of differential line voltages is particularly true for telephone devices employing sensing of "remote hold release." In remote hold release situations, a user answers a call using a first telephone device, puts the call on hold, and then picks up the call at a second telephone device connected to the same telephone line. Unless the first telephone device is capable of sensing that the call has been picked-up at the second telephone device, both telephone devices will simultaneously be in an off-hook state. With more than one device on the same telephone line off-hook, the differential line voltage will be further reduced. Prior art remote hold release sensing circuits used this further reduction in differential line voltage to determine when a call on hold had been picked-up at a second, e.g., remote, telephone device. The prior art remote hold release circuits typically look for the occurrence of a pre-set voltage drop to occur while the telephone is on hold. Prior art circuits do not, however, account for the fact that the reduction in differential line voltage further depends on the loop length of the telephone line connected to the first and second telephone devices. Thus, the prior art method for sensing remote hold release may not be adapted to operate properly for different telephone line loop lengths.

Accordingly, what is needed in the art is a circuit and method for detecting telephone line status, wherein the circuit and method provides for increased resolution of the measurement of differential line voltages at low voltages. A further need exists in the art for a simplified circuit for the determination of telephone line status without the need for an analog-to-digital converter to convert a measured differential line voltage to a digital signal suitable for processing by digital circuitry. Still further, a need exists in the art for a telephone line status circuit employing a remote hold release sensing circuit that is adaptive to use with telephone lines of varying loop lengths.

SUMMARY OF THE INVENTION

To address the above-discussed deficiencies of the prior art, the present invention provides a circuit and method for detecting telephone line status, wherein the circuit and method provides for increased resolution of the measurement of differential line voltages at low voltages. The present invention further provides a simplified circuit for the determination of the telephone line status without the need for an analog-to-digital converter to convert a measured differential line voltage to a digital signal suitable for processing by digital circuitry. The present invention provides, still further, a telephone line status circuit employing a remote hold release sensing circuit and method that is adaptive to use with telephone lines of varying loop lengths.

The circuit includes: (1) a high-impedance amplifier, couplable to the telecommunications network, for providing a DC voltage representing a differential line voltage between tip and ring conductors of the telecommunications network and (2) a pulse-generation circuit, coupled to an output of the amplifier, for generating a signal having first and second states, the signal assuming the second state for a period of time inversely proportional to the differential line voltage between the tip and ring conductors.

The present invention introduces a circuit having increased resolution in a relevant range of differential line voltages. More specifically, since the present invention calls for production of a periodic signal that is inversely proportional to the differential line voltage, the rate of change of the period length increases as the voltage decreases (hyperbolically).

In one embodiment of the present invention, the circuit further comprises a processor, coupled to an output of the pulse-generation circuit, for receiving the signal and determining therefrom a status of a telephone line comprising the tip and ring conductors. The present invention does not, however, require a processor. The signal may be processed by analog or discrete or integrated digital circuitry that is not software-controlled.

In one embodiment of the present invention, the circuit further comprises a status display, coupled to the output of the processor, for receiving and displaying the status of the telephone line. The status display, that may be as elementary as a single light source, provides an indication of line status. In the embodiment to be illustrated, the status display is capable of assuming off and on states, the off state indicating that the line is available for use and the on state indicating that the line is in use.

In one embodiment of the present invention, a voltage of the first state is greater than a voltage of the second state. Those of ordinary skill in the art will recognize, however, that the opposite may be true without departing from the broad scope of the present invention. In a more specific embodiment to be described more fully, the first state is nominally 5 volts and the second state is nominally 0 volts.

In one embodiment of the present invention, the telecommunications network comprises first and second tip and ring conductors corresponding to first and second telephone lines, the circuit further comprising a switch for alternatively coupling the pulse-generation circuit to the amplifier associated with the first telephone line and a second high-impedance amplifier associated with the second telephone line. The present invention is therefore adaptable to multiple-line environments.

In one embodiment of the present invention, the amplifier amplifies the differential line voltage by a gain of 1/K, where K equals a sum of input resistances of the amplifier divided by a feedback resistance of the amplifier. In a manner to be illustrated and described, the input and feedback resistance of the amplifier may be adjusted to give the amplifier a different response to differential line voltage.

In one embodiment of the present invention, the pulse-generation circuit further comprises a plurality of voltage dividers and a resistor and a capacitor, the period of time is equal to $K\Delta VR_i$, $C_i/V_{TR}$, where K is an inverse of a gain of the amplifier, $\Delta V$ is a voltage developed by the voltage dividers, $V_{TR}$ is the differential line voltage, Ri is a value of the resistor and Ci is a value of the capacitor.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
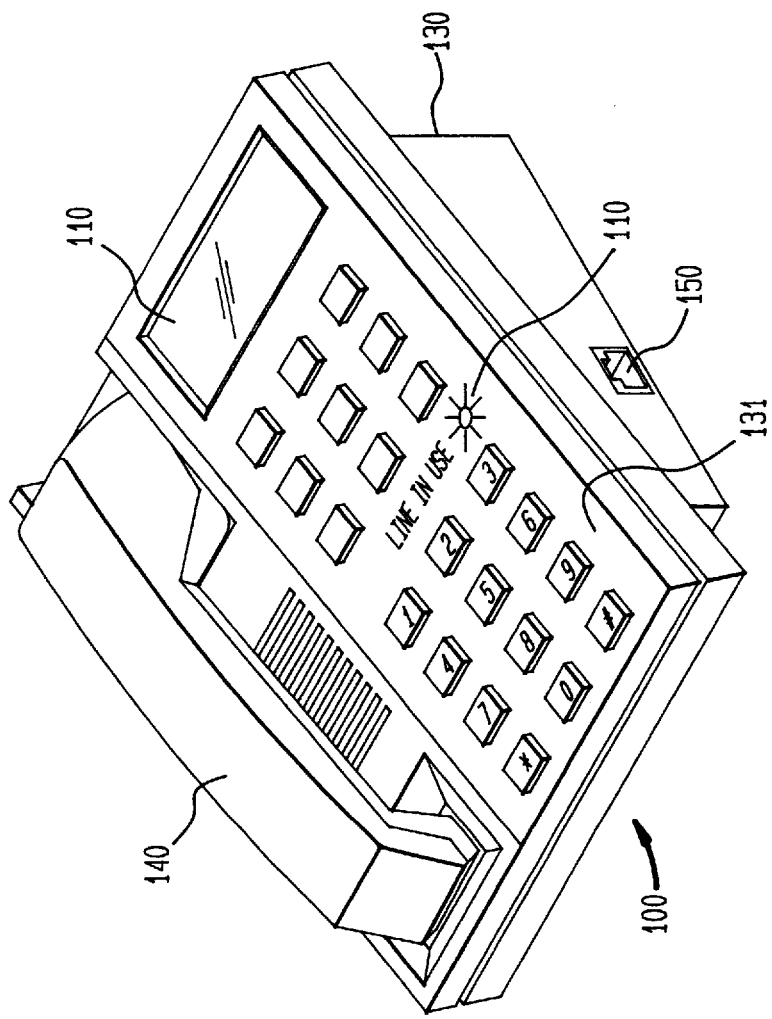
FIG. 1 discloses a multi-line telephone set equipped with displays for indicating line status.

Referring initially to FIG. 1, illustrated is telephone instrument 100 comprising a base 130 having a keypad 131 and a liquid crystal display ("LCD") 110 operating as a data display. LCD 110 is suitable for providing information to users such as time-of-day, dialed telephone numbers or the telephone number of an incoming call. A handset 140 is coupled to the base and provides an interface to a user for transmission and receipt of speech. A network interface 150 is couplable to a telecommunications network (not shown) via a telephone line (also not shown) comprising tip and ring conductors (to be shown in FIG. 2 and described in conjunction therewith).

The present invention is directed to detecting the line status of the telephone line servicing telephone instrument 100. LCD 110 may be used to provide line status information to a user. However, because LCDs generally rely on reflected light, they do not command the attention of users and are, therefore, not typically used for displaying line status. Alternatively, a light emitting diode ("LED"), such as LED 120, is suitable to alert a user of the present line status. Generally, LED 120 is turned ON when the line is in use, and turned OFF when the line is available.

Figure 2:
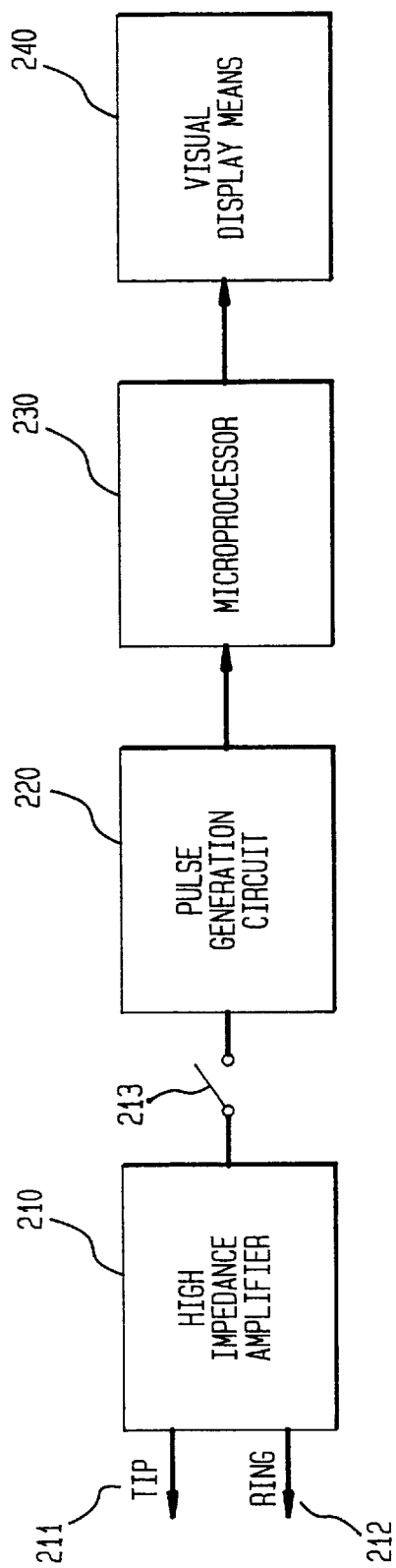
FIG. 2 discloses a high-level block diagram of circuitry for detecting a line status.

Referring next to FIG. 2, illustrated is a high-level block diagram of circuitry for detecting a line status. FIG. 2 generally illustrates the major functional components of a preferred embodiment of the present invention, comprising high-impedance amplifier 210, pulse-generation circuit 220, microprocessor 230, and display means 240.

A high-impedance amplifier 210 is suitably adapted to interface the line status detection circuitry to the tip and ring terminals 211, 212 of a telephone line. A high-impedance connection is used to minimize current drain while the telephone instrument is on-hook. The output of highimpedance amplifier 210 provides a DC voltage representing the differential line voltage between tip and ring terminals 211, 212 to the input of pulse-generation circuit 220. Switch 213, unnecessary in single line phones but which may be employed to advantage in multi-line phones, is suitably operative to selectively apply the output of high-impedance amplifier 210 to the input of pulse-generation circuit 220. The advantage of switch 213 in multi-line phones is that a single line status detection circuit may be shared by each line, thereby reducing the overall complexity and cost of multi-line phones.

According to one aspect of a preferred embodiment of the present invention, the output of pulse-generation circuit 220, with no input applied, is nominally 5 volts. According to a further aspect of a preferred embodiment of the present invention, when the output of high-impedance amplifier 210 is applied to the input of pulse-generation circuit 220 by closing switch 213, the output of pulse-generation circuit 220 assumes a value of 0 volts for a period of time inversely proportional to the differential line voltage between tip and ring terminals 211, 212. The output of pulsegeneration circuit 220, having either a value of 5 volts or 0 volts, is suitably adapted for input to a digital circuit, such as microprocessor 230.

Microprocessor 230 is suitably operative to sample the digital-level output of pulse-generation circuit 220, and is further suitably operative to sample the output at a rate sufficient to measure the length of time that the output pulse from pulse-generation circuit 220 has a value of 0 volts. As noted supra, the period of time that the output of pulse-generation circuit 220 has a value of 0 volts is inversely proportional to the differential line voltage between tip and ring terminals 211, 212. Therefore, as will be more fully discussed infra, microprocessor 230 can compute the differential line voltage between tip and ring terminals 211, 212 by determining the period of time that the output of pulse-generation circuit 220 has a value of 0 volts. Microprocessor 230 can then use the computed value of the differential line voltage to determine the line status. Microprocessor 230 may further output the line status information to visual display means 240, which, according to preferred embodiments of the present invention, is comprised of LCD 110 and LED 120 of FIG. 1.

Figure 3:
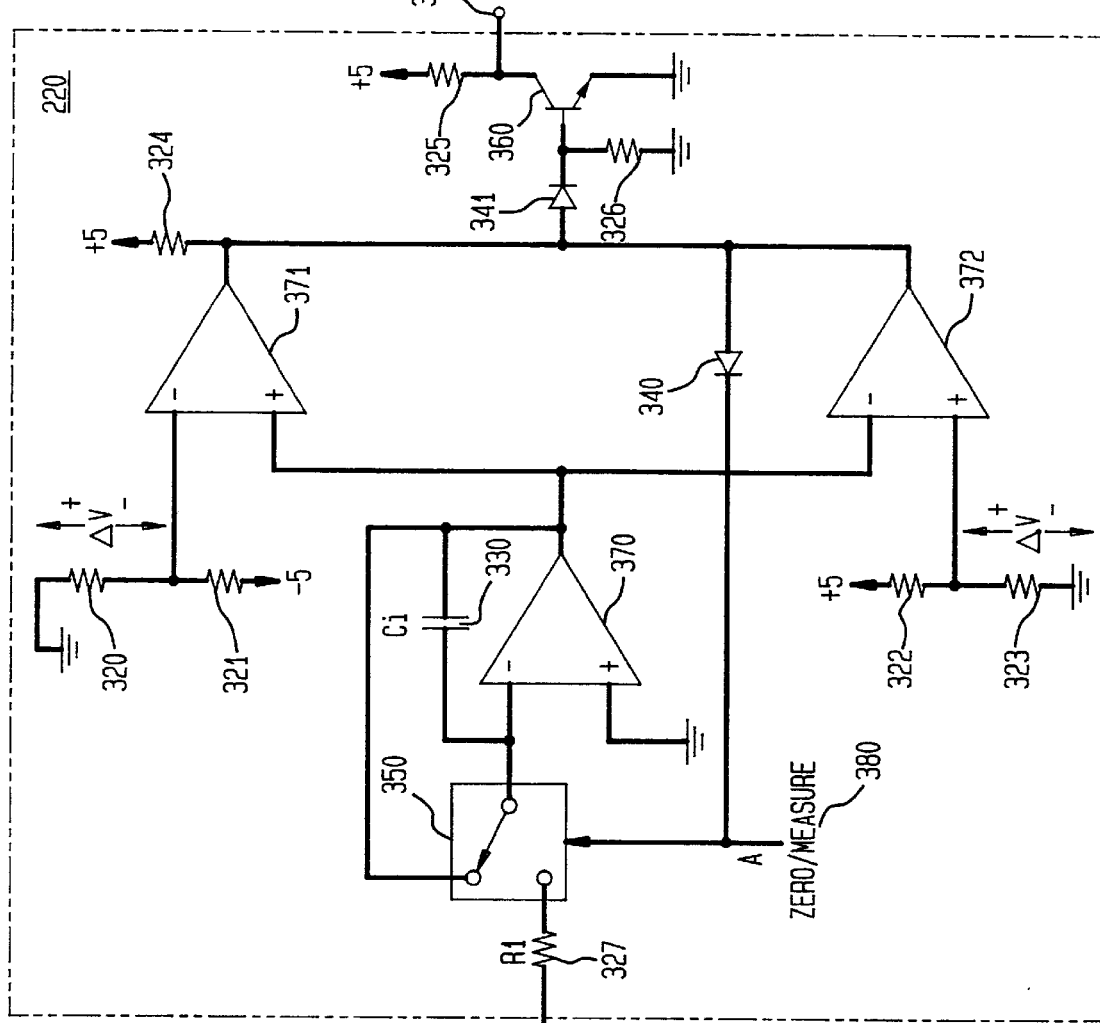
FIG. 3 discloses a detailed schematic drawing of a preferred embodiment of the circuitry of the present invention.

Turning now to FIG. 3, a detailed schematic of a preferred embodiment of the circuitry illustrated by the high-level block diagram of FIG. 2 is disclosed. High-impedance amplifier 210 is connected to the tip and ring terminals 211, 212 of the telephone line, and includes resistors 301, 302, 303, 304, 305, and 306, capacitor 307, and operational amplifier 308. Those of ordinary skill in the art will recognize that the circuit topology of high-impedance amplifier 210, comprised of suitably selected values for the above-reference components, is operative to amplify the differential line voltage between tip and ring terminals 211, 212 by a gain of 1/K, where K is equal to the ratio between the sum of the input resistances 301 and 302 to the feedback resistance 305.

The output of high-impedance amplifier 210 is gated through switch 213 to the input of pulsegeneration circuit 220. As further illustrated in FIG. 3, switch 213, according to another aspect of the present invention, in addition to gating the output of high-impedance amplifier 210 to the input of pulse-generation circuit 220, may also provide selection of multiple input lines to line status detection circuitry. The use of a single instance of line status detection circuitry in multi-line phones has the advantage of reduced overall circuit cost and complexity.

Pulse-generation circuit 220, according to a preferred embodiment of the present invention is comprised of resistors 320, 321, 322, 323, 324, 325, 326 and resistor $R_i$ 327, capacitor $C_i$, 330, diodes 340, 341, switch 350, transistor 360, and operational amplifiers 370, 371, 372. Those of skill in the art will recognize that the circuit topology of pulse-generation circuit 220, comprised of suitably selected values for the above-reference components, is operative to convert the input signal appearing at switch 213 into a pulse whose length $T_1$, is proportional to the inverse of the input signal voltage. In accordance with the preferred embodiment illustrated in FIG. 3, the duration $T_1$ of the output pulse of pulse-generation circuit 220 is equal to $K\Delta VR_iC_i/V_{TR}$, where K is the inverse of the gain of high-impedance amplifier 210, as discussed supra, $\Delta V$ is the voltage developed by the voltage dividers comprised of resistors 320, 321 and 322, 323, $V_{TR}$ is the differential line voltage present between tip and ring terminals 211, 212, and the values for resistor Ri and capacitor Ci are appropriately selected to achieve the desired pulse length.

The pulse generated by pulse-generation circuit 220 is provided at terminal 390 and directed to an input of microprocessor 230, as illustrated in FIG. 2. According to a preferred embodiment of the present invention, microprocessor 230 is a Hitachi HD404638 4-bit microcomputer. Microprocessor 230 is suitably operative to sample the pulse at output terminal 390 of pulsegeneration circuit 220. According to one aspect of the preferred embodiment, one sample is taken approximately once every 128 $\mu$seconds. The microprocessor continues to sample the pulse as long as it has a value of "0," corresponding to 0 volts. When the microprocessor samples a value of "1," corresponding to 5 volts, it is known that the pulse has terminated. The number of samples which the microprocessor has taken before encountering a sample value of "1" is inversely proportional to the differential line voltage $V_{TR}$. The number of samples may be stored by the microprocessor to be used in determining the line status. For determining whether the telephone is on-hook or off-hook, the microprocessor may use the procedure of Burger, et al., briefly described supra. As illustrated infra, the present invention improves on Burger, et al, by providing enhanced precision in the measurement of differential line voltage by substituting the non-linear pulse-generation circuitry of the present invention for the linear analog-to-digital converter used in Burger, et al.

Figure 4:
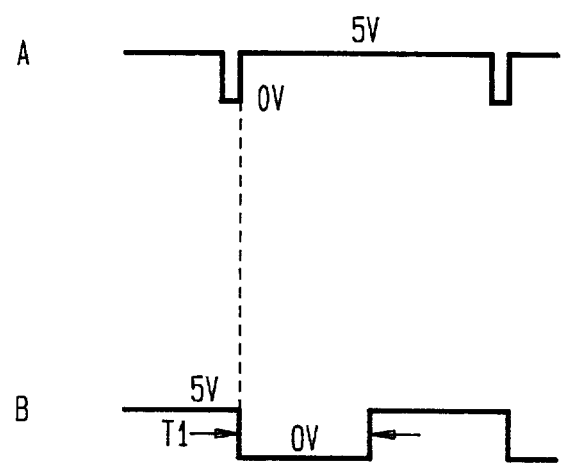
FIG. 4 illustrates signal waveforms corresponding to the control input and circuit output pulse for the circuitry of FIG. 3.

FIG. 4 illustrates signal waveforms corresponding to the control input and circuit output pulse for the circuitry of FIG. 3. The control input for pulse-generation circuit 220, according to one aspect of the present invention, comprises zero/measure control input 380. When it is desired to measure the differential line voltage, control input 380 directs switch 350 to contact the terminal end of resistor ($R_i$) 327. According to a preferred embodiment of the present invention, switch 350 is directed to contact the terminal end of resistor ($R_i$) 327 when control input 380 is asserted, e.g., is equal to 5 volts as shown in FIG. 4. The pulse length $T_1$ of the output pulse produced at output 390 of pulse-generation circuit 220 is measured by microprocessor 230 of FIG. 2. As will be more particularly discussed infra, meaningful pulse lengths vary between 1 and 255 counts depending on the differential input voltage, with one count occurring every 128 $\mu$seconds. A pulse having a duration longer than 255 counts, which corresponds to a cut-line condition, is terminated by resetting the pulse-generation circuit 220. To reset pulse generation circuit 220, control input 380 is deasserted, e.g., set equal to 0 volts.

Figure 5:
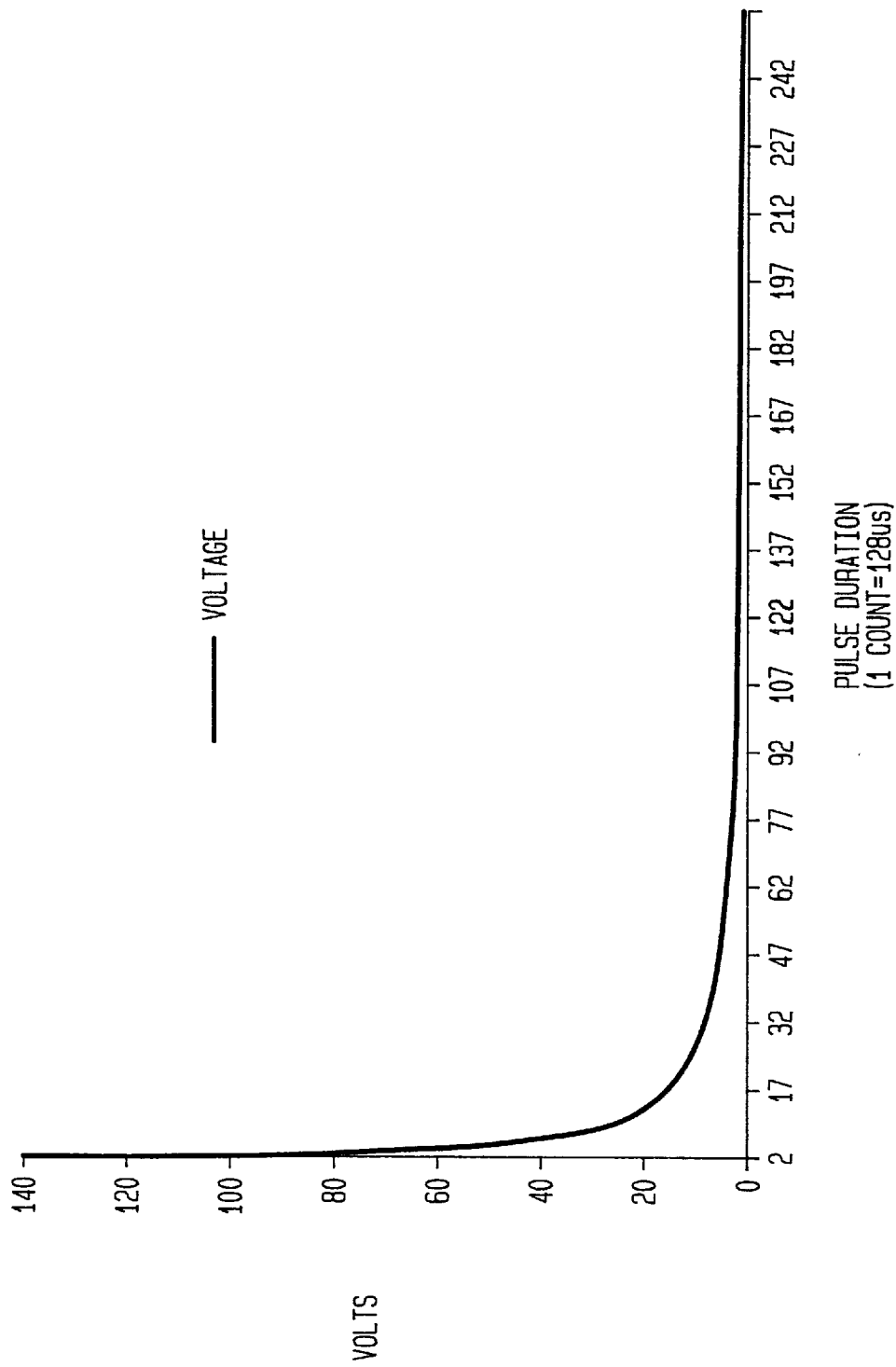
FIG. 5 illustrates the relationship between tip-ring voltage and the duration of the output pulse produced by the circuitry of FIG. 3.

FIG. 5 illustrates the relationship between tip-ring voltage and the duration of the output pulse produced by the circuitry of FIG. 3. A very important aspect of this relationship is the nonlinearity between the tip-ring voltage and the duration of the pulse produced by pulse-generation circuit 220. As those of skill in the art will recognize, FIG. 5 illustrates that the circuit response reflects a 1/x relationship, thus producing longer pulses for lower tip-ring voltages. This aspect can be employed to advantage in line status circuit wherein it is desired to sense remote hold release. As noted supra, prior art remote hold release circuits typically look for the occurrence of pre-set voltage drop to occur while the telephone is on hold. Prior art circuits do not, however, account for the fact that the reduction in differential line voltage is further dependent on the loop length of the telephone line connected to the first and second telephone instruments. Thus, the prior art method for sensing remote hold release may not be adapted to operate properly for different telephone line loop lengths. In situations requiring the sensing of remote hold release, the reduction in differential line voltage for long-loop telephone circuits will be much less than that in short-loop telephone circuits.

Thus, a remote hold release sense circuit which monitors the line for fixed reduction in differential fine voltage may not operate reliably hi both long-loop and short-loop telephone circuits. Recognizing that in long-loop telephone circuits the off-hook differential line voltage will be much lower than in short-loop telephone circuit, the present invention provides non-linear circuit that produces pulse of longer duration at lower differential line voltages. By producing longer pulse in long-loop telephone circuits, e.g., in circuits operating at lower differential line voltages, the present invention can thus produce pulse duration that is suitable for determining remote hold release in both long- and short-loop telephone circuits.

Although the present invention has been described in detail, those skilled in the art should understand that they can make various changes, substitutions and alterations herein without departing from the spirit and scope of the invention in its broadest form.

What is claimed is:

1. For use with a telecommunications network, a circuit for detecting telephone line status, comprising:
   a high-impedance amplifier, couplable to a first telephone line, for providing a DC voltage representing a differential line voltage between tip and ring conductors of said first telephone line; and
   a pulse-generation circuit, couplable to an output of said amplifier, for generating a signal having first and second states, said signal assuming said second state for a period of time inversely proportional to said differential line voltage between said tip and ring conductors.

2. The circuit as recited in claim 1 further comprising a processor, couplable to an output of said pulse-generation circuit, for receiving said signal and determining therefrom said status of said first telephone line comprising said tip and ring conductors.

3. The circuit as recited in claim 2 further comprising a status display, couplable to an output of said processor, for receiving and displaying said status of said first telephone line.

4. The circuit as recited in claim 1 wherein a voltage of said first state is greater than a voltage of said second state.

5. The circuit as recited in claim 1 wherein said telecommunications network comprises first and second tip and ring conductors corresponding to said first telephone line and a second telephone line, respectively, said circuit further comprising a switch for alternatively coupling said pulse-generation circuit to said high-impedance amplifier associated with said first telephone line and a second high-impedance amplifier associated with said second telephone line.

6. The circuit as recited in claim 1 wherein said amplifier amplifies said differential line voltage by a gain of 1/K, where K equals a sum of input resistances of said amplifier divided by a feedback resistance of said amplifier.

7. The circuit as recited in claim 1 wherein said pulse-generation circuit further comprises a plurality of voltage dividers and a resistor and a capacitor, said period of time is equal to $K \cdot \Delta V \cdot R_i \cdot C_i / V_{TR}$, where K is an inverse of a gain of said amplifier, $\Delta V$ is a voltage developed by said voltage dividers, $V_{TR}$ is said differential line voltage, Ri is a value of said resistor and Ci is a value of said capacitor.

8. For use with a telecommunications network, a method of detecting telephone line status, comprising the steps of:
   providing a DC voltage representing a differential line voltage between tip and ring conductors of a first telephone line; and
   generating a signal having first and second states, said signal assuming said second state for a period of time inversely proportional to said differential line voltage between said tip and ring conductors.

9. The method as recited in claim 8 further comprising the step of receiving said signal into a processor, said processor determining from said signal said status of said first telephone line comprising said tip and ring conductors.

10. The method as recited in claim 9 further comprising the step of displaying said status of said first telephone line.

11. The method as recited in claim 8 wherein a voltage of said first state is greater than a voltage of said second state.

12. The method as recited in claim 8 wherein said telecommunications network comprises first and second tip and ring conductors corresponding to said first telephone line and a second telephone line, respectively, said method further comprising the step of alternatively coupling said pulse-generation circuit to said amplifier associated with said first telephone line and a second high-impedance amplifier associated with said second telephone line.

13. The method as recited in claim 8 wherein said step of providing comprises the step of amplifying said differential line voltage by a gain of 1/K, where K equals a sum of input resistances of said amplifier divided by a feedback resistance of said amplifier.

14. The method as recited in claim 8 wherein said pulse-generation circuit further comprises a plurality of voltage dividers and a resistor and a capacitor, said period of time is equal to $K \cdot \Delta V \cdot R_i \cdot C_i / V_{TR}$, where K is an inverse of a gain of said amplifier, $\Delta V$ is a voltage developed by said voltage dividers, $V_{TR}$ is said differential line voltage, Ri is a value of said resistor and Ci is a value of said capacitor.

15. For use with a telecommunications network, a telephone instrument, comprising:
   a base having a keypad and data display;
   a handset, coupled to said base, for providing a user interface;
   a network interface couplable to said telecommunications network via a telephone line comprising tip and ring conductors;
   a processor, located within said base and coupled to said keypad, data display, handset and network interface, for communicating signals therebetween; and
   a circuit for detecting telephone line status, including:
      a high-impedance amplifier, couplable to said network interface, for providing a DC voltage representing a differential line voltage between said tip and ring conductors of said telephone line, and
      a pulse-generation circuit, coupled to an output of said amplifier, for generating a signal having first and second states, said signal assuming said second state for period of time inversely proportional to said differential line voltage between said tip and ring conductors, said processor receiving said signal and determining therefrom said status of said telephone line.

16. The telephone instrument as recited in claim 15 further comprising a status display, coupled to said processor, for receiving and displaying said status of said telephone line.

17. The telephone instrument as recited in claim 15 wherein a voltage of the first state is greater than a voltage of said second state.

18. The telephone instrument as recited in claim 15 wherein said amplifier amplifies said differential line voltage by a gain of 1/K, where K equals a sum of input resistances of said amplifier divided by a feedback resistance of said amplifier.

19. The telephone instrument as recited in claim 15 wherein said pulse-generation circuit further comprises a plurality of voltage dividers and a resistor and a capacitor, said period of time is equal to $K \cdot \Delta V \cdot R_i \cdot C_i / V_{TR}$, where K is an inverse of a gain of said amplifier, $\Delta V$ is a voltage developed by said voltage dividers, $V_{TR}$ is said differential line voltage, Ri is a value of said resistor and Ci is a value of said capacitor.

20. The telephone instrument as recited in claim 15 wherein said telecommunications network comprises Subscriber Loop Carrier (SLC) lines.

* * * * *